US012403954B2

United States Patent
Akiyama et al.

(10) Patent No.: US 12,403,954 B2
(45) Date of Patent: Sep. 2, 2025

(54) CRAWLER-TYPE WORK MACHINE

(71) Applicant: KOMATSU LTD., Tokyo (JP)

(72) Inventors: Naoya Akiyama, Tokyo (JP); Takeshi Yoshikawa, Tokyo (JP); Hiroaki Takeshima, Tokyo (JP)

(73) Assignee: KOMATSU LTD., Tokyo (JP)

( * ) Notice: Subject to any disclaimer, the term of this patent is extended or adjusted under 35 U.S.C. 154(b) by 435 days.

(21) Appl. No.: 17/918,167

(22) PCT Filed: Jun. 15, 2021

(86) PCT No.: PCT/JP2021/022729
§ 371 (c)(1),
(2) Date: Oct. 11, 2022

(87) PCT Pub. No.: WO2022/024573
PCT Pub. Date: Feb. 3, 2022

(65) Prior Publication Data
US 2023/0136679 A1    May 4, 2023

(30) Foreign Application Priority Data
Jul. 30, 2020    (JP) .................................. 2020-129004

(51) Int. Cl.
*B62D 11/08*    (2006.01)
*E02F 9/02*     (2006.01)
(Continued)

(52) U.S. Cl.
CPC ............... *B62D 11/08* (2013.01); *E02F 9/02* (2013.01); *E02F 9/202* (2013.01); *F16H 57/0486* (2013.01)

(58) Field of Classification Search
CPC ...... B62D 11/08; E02F 9/202; F16H 57/0486; F16H 2702/02; F16H 1/46; F16H 57/042; F16H 57/043
See application file for complete search history.

(56) References Cited

U.S. PATENT DOCUMENTS

| | | | |
|---|---|---|---|
| 2,974,545 A * | 3/1961 | Davies ................ | F16H 61/0262 324/173 |
| 3,144,107 A * | 8/1964 | Davies ................... | F16H 37/00 475/29 |

(Continued)

FOREIGN PATENT DOCUMENTS

| CN | 101649628 A | 2/2010 |
|---|---|---|
| JP | 53-82145 U | 7/1978 |

(Continued)

OTHER PUBLICATIONS

The International Search Report for the corresponding international application No. PCT/JP2021/022729, issued on Aug. 10, 2021.

(Continued)

*Primary Examiner* — Derek D Knight
(74) *Attorney, Agent, or Firm* — GLOBAL IP COUNSELORS, LLP

(57) ABSTRACT

The bulldozer has a right first oil channel, a right second oil channel, and a right third oil channel. The right first oil channel guides a portion of the lubricating oil discharged by a hydraulic pump to a right steering brake. The right second first oil channel guides a portion of the lubricating oil discharged by the hydraulic pump to a right planetary gear mechanism. The right third oil channel guides at least a portion of the lubricating oil that has passed through the right planetary gear mechanism to a right steering brake. At least a portion of the planetary gear mechanism is disposed further inside than the right steering brake in a radial direction perpendicular to the center axis of an input shaft.

4 Claims, 5 Drawing Sheets

(51) Int. Cl.
    *E02F 9/20*               (2006.01)
    *F16H 57/04*           (2010.01)

(56) References Cited

U.S. PATENT DOCUMENTS

| | | | | |
|---|---|---|---|---|
| 3,982,618 A * | 9/1976 | Horsch | ............ | F16D 65/853 |
| | | | | 188/264 E |
| 6,662,904 B2 * | 12/2003 | Omote | ............ | F16H 57/0427 |
| | | | | 192/70.12 |
| 9,695,929 B2 * | 7/2017 | Miyoshi | ............ | F16H 57/0479 |
| 10,352,024 B2 * | 7/2019 | Akiyama | ............ | E02F 9/225 |
| 2009/0131210 A1 | 5/2009 | Kassler | | |
| 2010/0198472 A1 * | 8/2010 | Kure | ............ | B60T 5/00 |
| | | | | 701/70 |
| 2018/0230676 A1 | 8/2018 | Akiyama et al. | | |

FOREIGN PATENT DOCUMENTS

| | | |
|---|---|---|
| JP | 61-41052 A | 2/1986 |
| JP | H09-315337 A | 12/1997 |
| JP | 2001-58579 A | 3/2001 |
| JP | 2001-227625 A | 8/2001 |
| JP | 2003-74678 A | 3/2003 |
| JP | 2003-139201 A | 5/2003 |
| JP | 2007-085409 A | 4/2007 |
| JP | 2007-113683 A | 5/2007 |
| JP | 2009-222178 A | 10/2009 |
| JP | 2017-71357 A | 4/2017 |
| JP | WO2020/084937 A1 | 9/2021 |
| WO | 2017/061420 A1 | 4/2017 |

OTHER PUBLICATIONS

The Office Action for the corresponding Chinese application No. 202180030115.3 issued on May 6, 2024.
The Office Action for the corresponding China application No. 202180030115.3 issued on Sep. 6, 2024.
Notice of Reasons for Refusal received for Japanese Application Serial No. 2022-540057, mailed on May 7, 2025, 11 pages. (English Translation Submitted).

* cited by examiner

CRAWLER-TYPE WORK MACHINE

CROSS-REFERENCE TO RELATED APPLICATIONS

This application is a U.S. National stage application of International Application No. PCT/JP2021/022729, filed on Jun. 15, 2021. This U.S. National stage application claims priority under 35 U.S.C. § 119(a) to Japanese Patent Application No. 2020-129004, filed in Japan on Jul. 30, 2020, the entire contents of which are hereby incorporated herein by reference.

TECHNICAL FIELD

The present disclosure relates to a crawler-type work machine.

BACKGROUND ART

In a crawler-type work machine (e.g., a bulldozer), power from an engine is transmitted through a transmission to left and right drive wheels so that left and right crawler belts are driven by the left and right drive wheels. In this type of crawler-type work machine, turning to the left and right is executed by controlling the hydraulic pressure of left and right steering clutches and left and right steering brakes provided in correspondence to the left and right drive wheels.

Japanese Patent Laid-open No. 2017-71357 proposes a method for supplying, to a steering brake, a portion of the lubricating oil supplied from a hydraulic pump to a steering clutch, in order to use the lubricating oil efficiently.

SUMMARY

While it is assumed that a planetary gear mechanism may be provided between an input shaft and an output shaft in order to make the steering clutch more compact, Japanese Patent Laid-open No. 2017-71357 does not examine how to efficiently use the lubricating oil when providing a planetary gear mechanism.

An object of the present disclosure is to provide a crawler-type work machine that is able to use lubricating oil efficiently.

A crawler-type work machine according to one aspect of the present disclosure has a planetary gear mechanism, a steering clutch, a steering brake, a hydraulic pump, a first oil channel, a second oil channel, and a third oil channel. The planetary gear mechanism is disposed between an input shaft and an output shaft. The steering clutch is configured to switch between transmitting and blocking the rotation from the input shaft to the output shaft by the planetary gear mechanism. The steering brake is configured to brake the rotation of the output shaft. The hydraulic pump is configured to discharge a lubricating oil. The first oil channel is configured to guide a portion of the lubricating oil discharged by the hydraulic pump to the steering brake. The second oil channel is configured to guide a portion of the lubricating oil discharged by the hydraulic pump to the planetary gear mechanism. The third oil channel is configured to guide at least a portion of the lubricating oil that has passed through the planetary gear mechanism to the steering brake. At least a portion of the planetary gear mechanism is disposed further inside than the steering brake in a radial direction perpendicular to a center axis of the input shaft.

According to the crawler-type work machine as in the present disclosure, the lubricating oil can be used efficiently.

Figure 1:
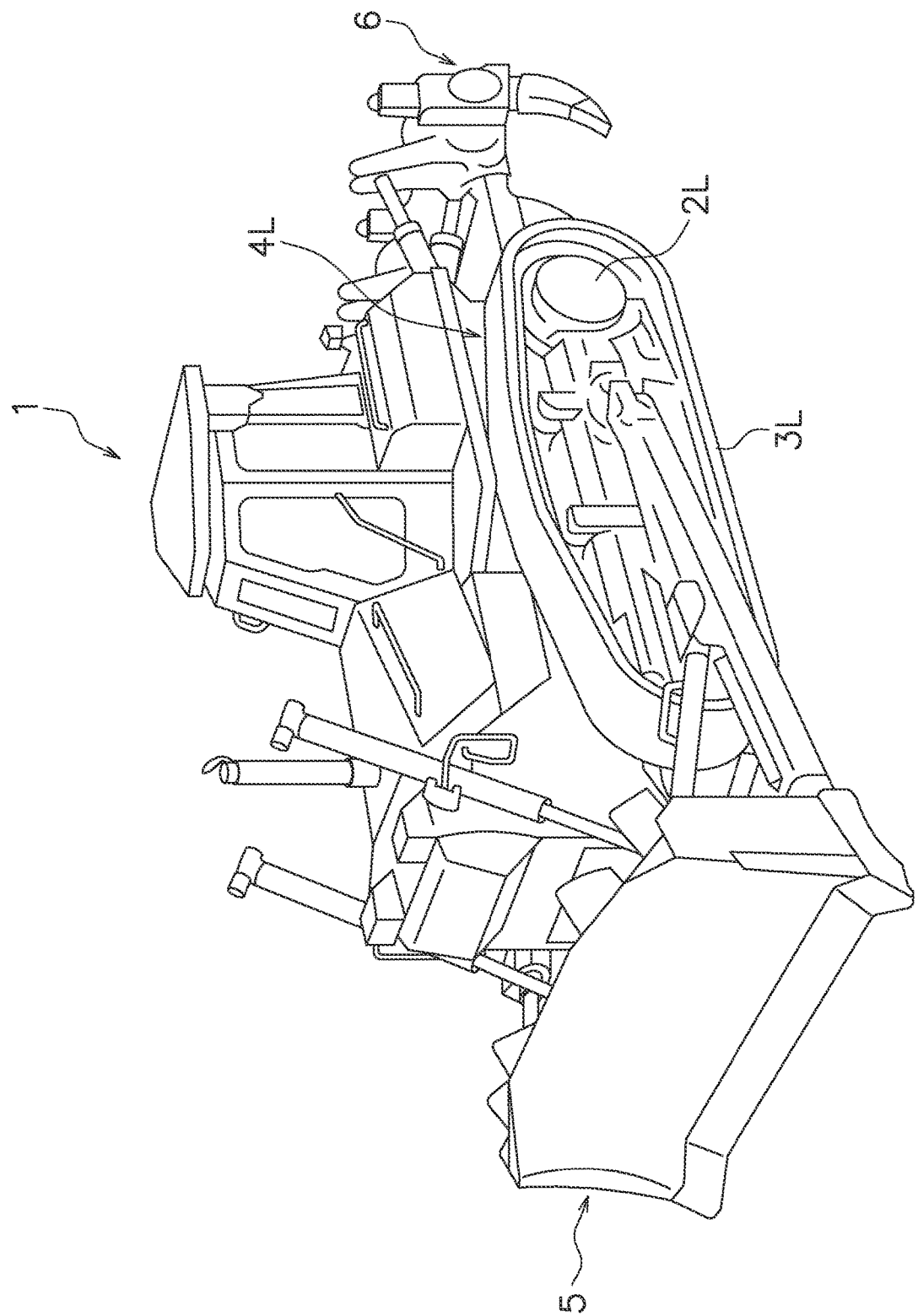
FIG. 1 is a perspective view of a bulldozer that is an example of the crawler-type work machine.
Figure 2:
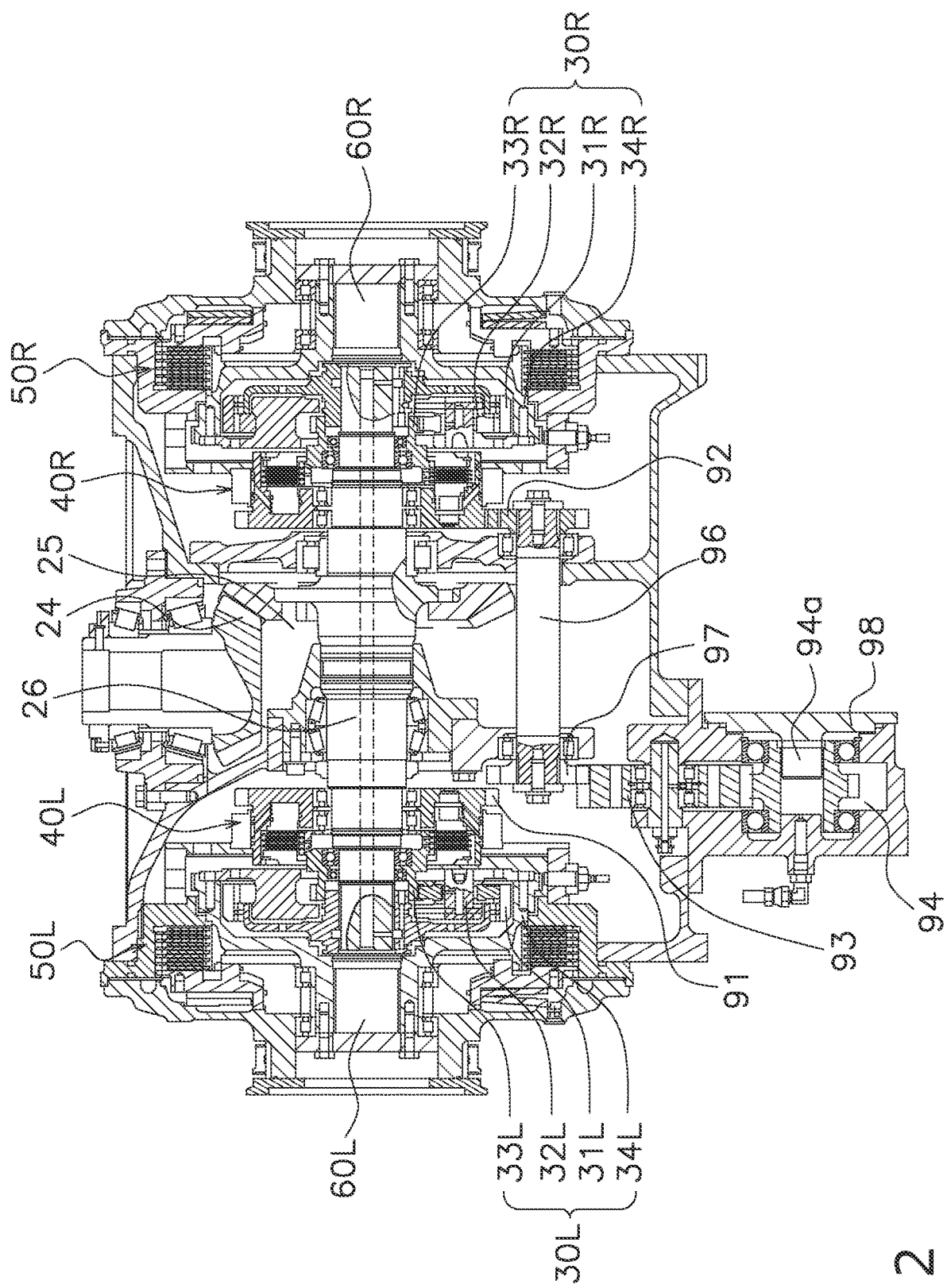
FIG. 2 is a cross-sectional configuration diagram of a power transmission system of the bulldozer.
Figure 3:
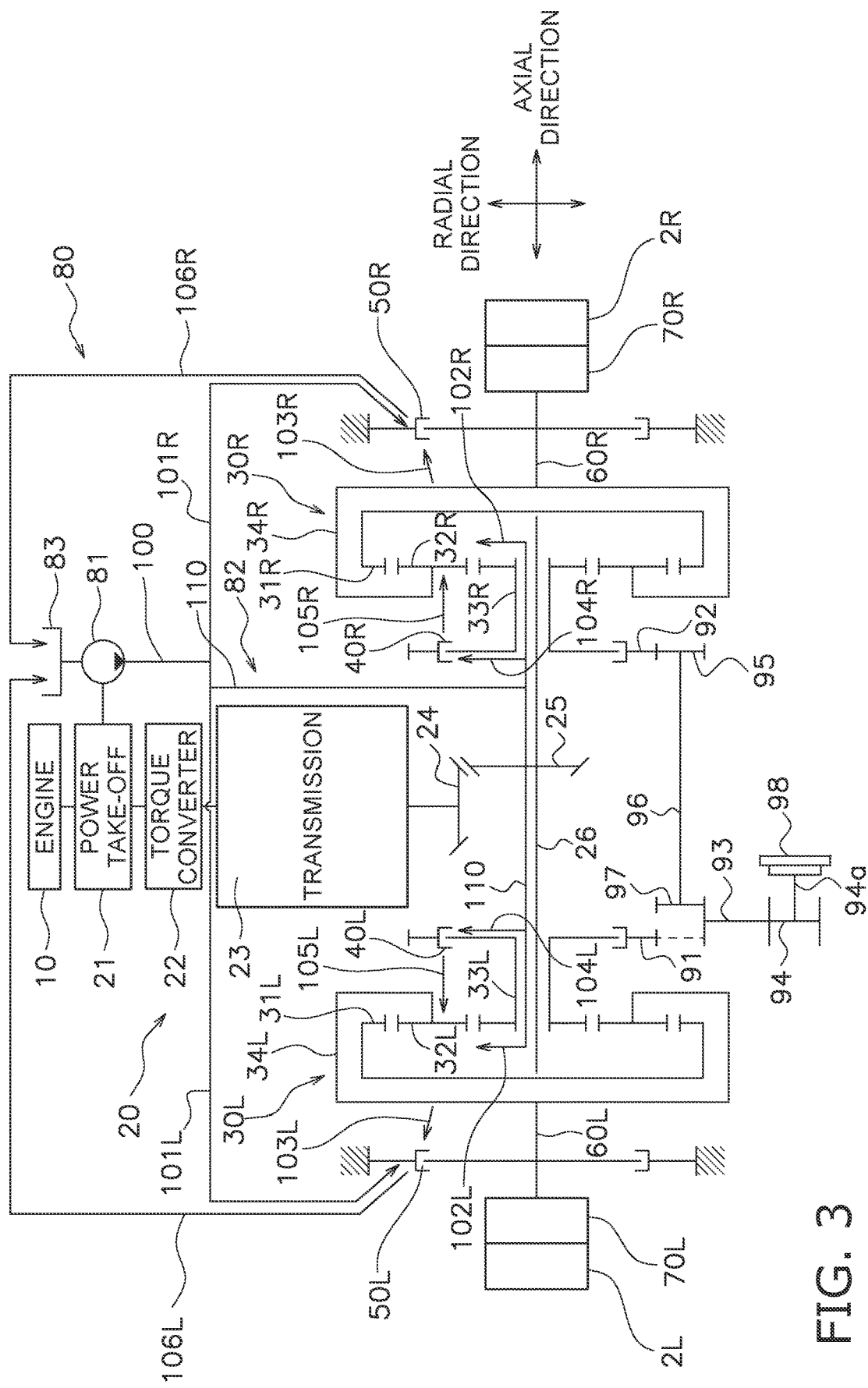
FIG. 3 is an outline system configuration diagram of the power transmission system of the bulldozer.

DESCRIPTION OF EMBODIMENTS (Configuration of Bulldozer 1)
FIG. 1 is a perspective view of a bulldozer 1 that is an example of the crawler-type work machine. FIG. 2 is a cross-sectional configuration diagram of the power transmission system of the bulldozer 1. FIG. 3 is an outline system configuration diagram of the power transmission system of the bulldozer 1.

The bulldozer 1 is equipped with: left and right travel devices 4L, 4R that respectively have left and right sprockets 2L, 2R and left and right crawler belts 3L, 3R; a blade 5 provided at a vehicle front part; and a ripper device 6 provided at a vehicle rear part.

The bulldozer 1 is able to do work such as pushing earth with the blade 5, and work such as crushing and excavating with the ripper device 6.

The bulldozer 1 includes an engine 10, a power transmission device 20, left and right planetary gear mechanisms 30L, 30R, left and right steering clutches 40L, 40R, left and right steering brakes 50L, 50R, left and right output shafts 60L, 60R, left and right final drive gears 70L, 70R, and a lubricating oil supply unit 80.

The power transmission device 20 transmits power from the engine 10 to the left and right planetary gear mechanisms 30L, 30R. The power transmission device 20 includes a power take-off device 21, a torque converter 22, a transmission 23, a pinion 24, a bevel gear 25, and an input shaft 26.

The power transmission device 21 transmits power from the engine 10 to the torque converter 22 and the lubricating oil supply unit 80. The torque converter 22 transmits the power of the engine 10 transmitted by the power take-off device 21 to the transmission 23 by means of a fluid. The transmission 23 changes the speed of the rotation motion transmitted from the torque converter 22. The transmission 23 is able to switch between forward travel and reverse travel. The transmission 23 is coupled to the pinion 24. Power from the transmission 23 is transmitted through the pinion 24 and the bevel gear 25 to the input shaft 26.

The left and right planetary gear mechanisms 30L, 30R are disposed between the input shaft 26 and the left and right output shafts 60L, 60R. The left and right planetary gear mechanisms 30L, 30R respectively have left and right ring gears 31L, 31R, left and right planetary gears 32L, 32R, left and right sun gears 33L, 33R, and left and right carriers 34L, 34R.

The left and right ring gears 31L, 31R are coupled to the input shaft 26. The left and right planetary gears 32L, 32R are respectively disposed inside the left and right ring gears 31L, 31R in a radial direction perpendicular to the center axis of the input shaft 26. The left and right planetary gears 32L, 32R are respectively disposed between the left and right ring gears 31L, 31R and the left and right sun gears 33L, 33R. The left and right planetary gears 32L, 32R respectively mesh with the left and right ring gears 31L, 31R and the left and right sun gears 33L, 33R. The left and right sun gears 33L, 33R are rotatably attached to the input shaft 26. The left and right sun gears 33L, 33R are respectively disposed inside the left and right planetary gears 32L, 32R in the radial direction. The left and right sun gears 33L, 33R are respectively coupled to the left and right steering clutches 40L, 40R. The left and right carriers 34L, 34R are respectively coupled to the left and right planetary gears 32L, 32R and the left and right output shafts 60L, 60R.

The left and right steering clutches 40L, 40R are wet multiplate clutches that can be respectively engaged or disengaged with the left and right sun gears 33L, 33R. The left and right steering clutches 40L, 40R switch between respectively transmitting and blocking the rotational force from the input shaft 26 to the left and right output shafts 60L, 60R by means of the respective left and right planetary gear mechanisms 30L, 30R.

Specifically, when the left steering clutch 40L is coupled and the left sun gear 33L is directly coupled to a first clutch gear 91, the first clutch gear 91 cannot rotate (see below) and the left sun gear 33L also cannot rotate. As a result, the rotation of the input shaft 26 is transmitted through the left ring gear 31L, the left planetary gear 32L, and the left carrier 34L to the left output shaft 60L. When the left steering clutch 40L is disengaged and the left sun gear 33L enters a freely rotating state, the rotation from the input shaft 26 to the left output shaft 60L is blocked. Similarly, the transmission or blocking of the rotation from the input shaft 26 to the right output shaft 60R is switched in accordance with the engagement or disengagement of the right steering clutch 40R.

As illustrated in FIG. 3, the first clutch gear 91 is attached to the left steering clutch 40L and the first clutch gear 91 is coupled to an idler gear 93 and a pinion gear 94. In addition, a second clutch gear 92 is attached to the right steering clutch 40R and the second clutch gear 92 is coupled to the idler gear 93 and the pinion gear 94 via a first transfer gear 95, an auxiliary shaft 96, and a second transfer gear 97. A pinion shaft 94a is coupled to the pinion gear 94 and is fixed by a fixing member 98 in an unrotatable manner. Therefore, the rotational force from the left and right steering clutches 40L, 40R to the left and right sun gears 33L, 33R is not applied.

The fixing member 98 is detachably fixed to an unillustrated housing. When the fixing member 98 is removed from the housing, the fixing member 98 can be removed from the pinion gear 94. As a result, the fixing of the pinion gear 94 by the fixing member 98 can be released.

When the fixing of the pinion gear 94 by the fixing member 98 is released, a turning motor (not illustrated) may be coupled to the pinion shaft 94a. In this case, when the left and right steering clutches 40L, 40R are engaged and the rotational force of the turning motor is transmitted to the left and right sun gears 33L, 33R through the left and right steering clutches 40L, 40R, the left and right sun gears 33L, 33R rotate in the opposite directions at the same rotation speed. Consequently, a rotation speed difference is generated in the left and right output shafts 60L, 60R and the bulldozer 1 is able to turn gently to the left or right.

The left and right steering brakes 50L, 50R respectively brake the rotation of the left and right output shafts 60L, 60R. The left and right steering brakes 50L, 50R are wet multiplate clutches that can be respectively engaged or disengaged with the left and right output shafts 60L, 60R.

When the left steering brake 50L is engaged, braking is applied to the rotation of the left output shaft 60L. As a result, the rotation of the left final drive gear 70L coupled to the left sprocket 2L is reduced. When the right steering brake 50R is engaged, braking is applied to the rotation of the right output shaft 60R. As a result, the rotation of the right final drive gear 70R coupled to the right sprocket 2R is reduced.

The lubricating oil supply unit 80 has a hydraulic pump 81, a lubricating oil channel 82, and a lubricating oil tank 83.

The hydraulic pump 81 is driven by power from the engine 10 transmitted from the power take-off device 21. The hydraulic pump 81 discharges the lubricating oil from the lubricating oil tank 83 to the lubricating oil channel 82. The hydraulic pump 81 is a fixed displacement pump in the present embodiment.

The lubricating oil channel 82 includes a first oil supply channel 100, a second oil supply channel 110, left and right first oil channels 101L, 101R, left and right second oil channels 102L, 102R, left and right third oil channels 103L, 103R, left and right fourth oil channels 104L, 104R, left and right fifth oil channels 105L, 105R, and left and right oil discharge channels 106L, 106R.

The first oil supply channel 100 is continuous with the hydraulic pump 81 to the second oil supply channel 110 and the left and right first oil channels 101L, 101R. The first oil supply channel 100 supplies the lubricating oil discharged from the hydraulic pump 81 to the second oil supply channel 110 and the left and right first oil channels 101L, 101R.

The left and right first oil channels 101L, 101R guide a portion of the lubricating oil discharged by the hydraulic pump 81 to the left and right steering brakes 50L, 50R.

The second oil supply channel 110 is continuous with the first oil supply channel 100 and the inside of the input shaft 26. The second oil supply channel 110 guides a portion of the lubricating oil discharged by the hydraulic pump 81 to the left and right second oil channels 102L, 102R and the left and right fourth oil channels 104L, 104R.

The left and right second oil channels 102L, 102R respectively guide a portion of the lubricating oil discharged by the hydraulic pump 81 to the left and right planetary gear mechanisms 30L, 30R. The left and right third oil channels 103L, 103R respectively guide at least a portion of the lubricating oil that has passed through the left and right planetary gear mechanisms 30L, 30R to the left and right steering brakes 50L, 50R. In the present embodiment, the left and right third oil channels 103L, 103R respectively guide all of the lubricating oil that has passed through the left and right planetary gear mechanisms 30L, 30R to the left and right steering brakes 50L, 50R.

The left and right fourth oil channels 104L, 104R respectively guide a portion of the lubricating oil discharged by the hydraulic pump 81 to the left and right steering clutches 40L, 40R. The left and right fifth oil channels 105L, 105R respectively guide at least a portion of the lubricating oil that has passed through the left and right steering brakes 40L, 40R to the left and right steering brakes 50L, 50R. Specifically, the left and right fifth oil channels 105L, 105R guide all of the lubricating oil that has passed through the left and right steering brakes 40L, 40R to the left and right steering brakes 50L, 50R via the left and right planetary gear mechanisms 30L, 30R and the left and right third oil channels 103L, 103R.

In this way, all of the lubricating oil guided to the left and right planetary gear mechanisms 30L, 30R and to the left and right steering clutches 40L, 40R is guided respectively to the left and right steering brakes 50L, 50R via the left and right third oil channels 103L, 103R, and the left and right fifth oil channels 105L, 105R in the present embodiment.

The left and right oil discharge channels 106L, 106R guide the lubricating oil that has passed through the left and right steering brakes 50L, 50R to the lubricating oil tank 83.

(Configuration in the Vicinity of the Lubricating Oil Channel 82)

Figure 4:
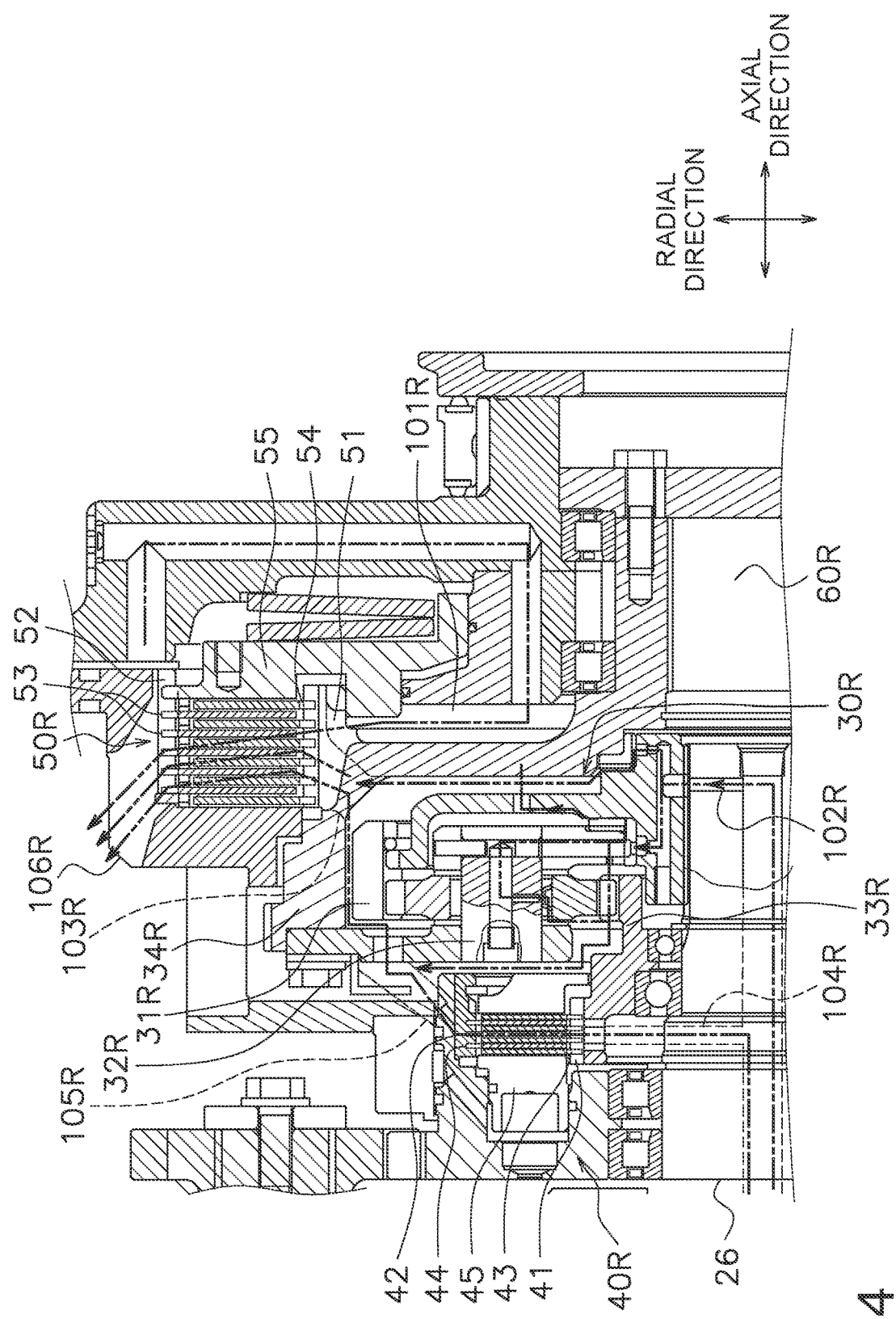
FIG. 4 is a cross-sectional view illustrating a configuration in the vicinity of a lubricating oil channel.

FIG. 4 is a cross-sectional view illustrating a configuration in the vicinity of the lubricating oil channel 82. A cross-section perpendicular to the center axis of the input shaft 26 is depicted in FIG. 4. The configuration in the vicinity of the lubricating oil channel 82 is basically right-left symmetrical and the configuration on the right side will be explained below.

The right steering clutch 40R has a rotating member 41, a clutch housing 42, a plurality of clutch disks 43, a plurality of clutch plates 44, and a clutch piston 45.

The rotating member 41 is supported by the input shaft 26 and rotates around the center axis of the input shaft 26. The clutch housing 42 is disposed so as to allow relative rotation with respect to the rotating member 41. The clutch housing 42 encircles the outside of the clutch disks 43 and the clutch plates 44. The clutch disks 43 are supported by the rotating member 41. The clutch plates 44 are supported by the clutch housing 42. The clutch disks 43 and the clutch plates 44 are disposed alternately in the axial direction parallel to the center axis of the input shaft 26. The clutch piston 45 brings the clutch discs 43 and the clutch plates 44 into pressure contact when hydraulic fluid is supplied. As a result, the right steering clutch 40R enters an engaged state.

The right steering brake 50R has a rotating member 51, a brake housing 52, a plurality of fixing plates 53, a plurality of brake disks 54, and a brake piston 55.

The rotating member 51 is fixed to the right output shaft 60R and rotates around the center axis of the right output shaft 60R. The brake housing 52 is able to rotate relatively with respect to the rotating member 51. In the present embodiment, the brake housing 52 is fixed and the brake housing 52 itself does not rotate. The brake housing 52 encircles the outside of the fixing plates 53 and the brake disks 54. The fixing plates 53 are attached to the brake housing 52. The fixing plates 53 may move slightly in the axial direction with respect to the brake housing 52. The brake disks 54 are supported by the rotating member 51. The brake disks 54 may move slightly in the axial direction with respect to the rotating member 51.

The fixing plates 53 and the brake disks 54 are disposed alternately in the axial direction. The fixing plates 53 and the brake disks 54 are pressed together by an unillustrated spring (e.g., a disk spring or a coil spring). The brake piston 55 causes the fixing plates 53 and the brake disks 54 to separate from each other when hydraulic fluid is supplied. Consequently, the right steering brake 50R enters a non-braking state.

At least a portion of the right planetary gear mechanism 30R is disposed further inside than the right steering brake 50R in the radial direction. Specifically, the right ring gear 31R is disposed further to the inside than the brake disks 54 in the radial direction. Moreover, the right planetary gear 32R and the right sun gear 33R disposed on the inside of the right ring gear 31R are also disposed further to the inside than the brake disks 54 in the radial direction. Furthermore, a portion of the right carrier 34R coupled to the right planetary gear 32R and the right output shaft 60R is also disposed further to the inside than the brake disks 54 in the radial direction.

At least a portion of the right steering clutch 40R is disposed further inside than the right steering brake 50R in the radial direction. Specifically, the clutch disks 43 and the clutch plates 44 are disposed further to the inside than the brake disks 54 in the radial direction.

The phrase "at least a portion of the member X is disposed further to the inside than the member Y in the radial direction" in the present description signifies that the minimum distance between the member X and the center axis is less than the minimum distance between the member Y and the center axis when viewing from the axial direction parallel to the center axis of the input shaft 26. In this case, the position of the member X in the axial direction and the position of the member Y in the axial direction may partially or completely overlap each other or may not overlap each other.

In the present embodiment, while the right steering brake 50R, the right planetary gear mechanism 30R, and the right steering clutch 40R are disposed in said order from the right side, the disposition order in the axial direction may be changed as appropriate.

Figure 5:
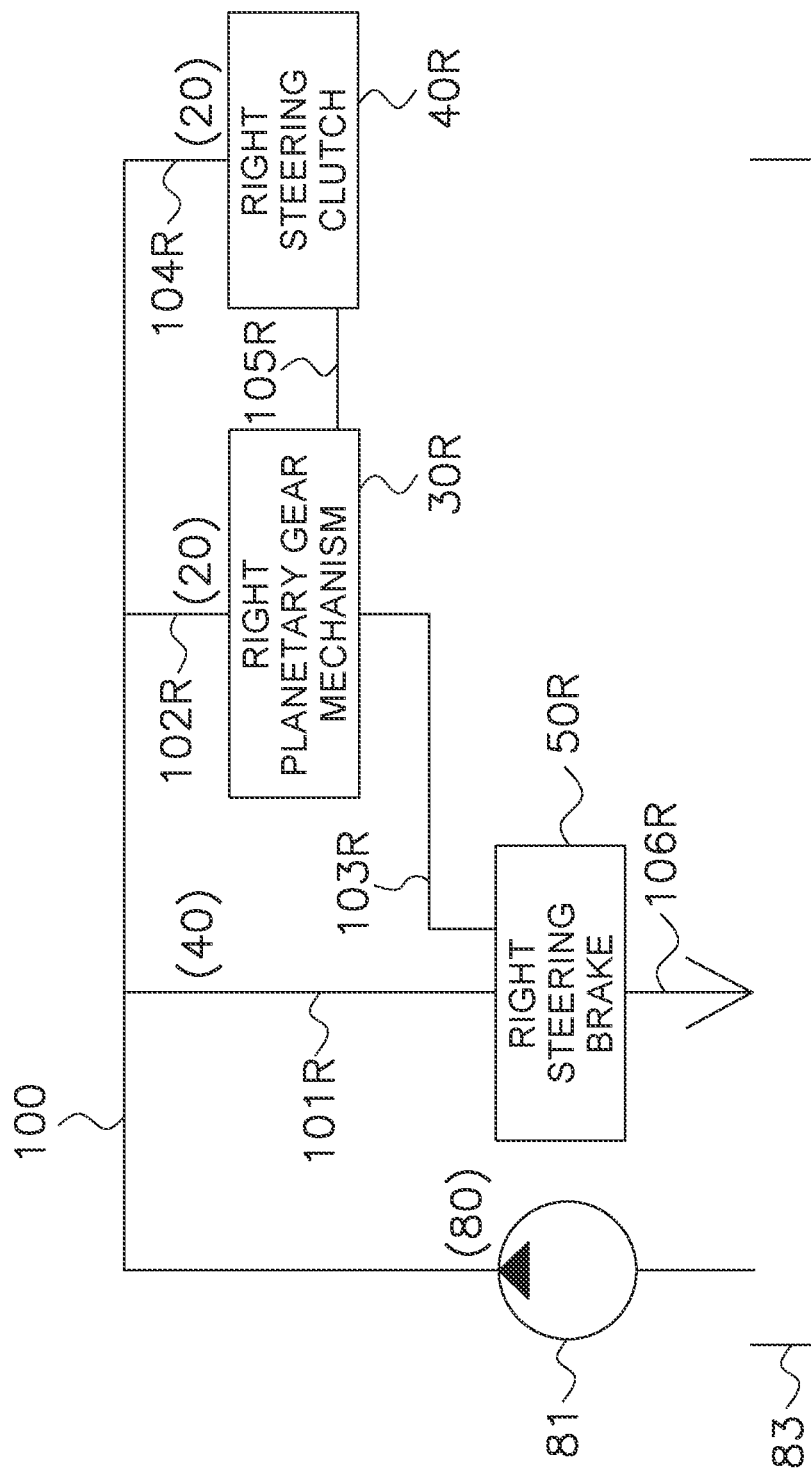
FIG. 5 is a schematic view for explaining the flow of the lubricating oil.

Next, the flow of the lubricating oil will be explained. FIG. 5 is a schematic view for explaining the flow of the lubricating oil.

The lubricating oil discharged from the hydraulic pump 81 is distributed to the right first oil channel 101R, the right second oil channel 102R, and the right fourth oil channel 104R via the first oil supply channel 100 and the second oil supply channel 110. The distribution ratio to the oil channels may be adjusted as appropriate by changing the opening radius of each oil channel.

The lubricating oil distributed to the right fourth oil channel 104R is guided from the right fifth oil channel 105R to the right planetary gear mechanism 30R by centrifugal force after the right steering clutch 40R has been lubricated.

After the right planetary gear mechanism 30R has been lubricated, the lubricating oil distributed to the right second oil channel 102R is guided from the right third oil channel 103R to the right steering brake 50R by centrifugal force along with the lubricating oil guided from the right fifth oil channel 105R to the right planetary gear mechanism 30R.

After the right steering brake 50R has been lubricated with the lubricating oil guided from the right third oil channel 103R to the right steering brake 50R, the lubricating oil distributed to the right first oil channel 101R is guided from the right oil discharge passage 106R to the lubricating oil tank 83 by centrifugal force.

The bulldozer 1 includes a right first oil channel 101R, a right second oil channel 102R, and a right third oil channel 103R. The right first oil channel 101R guides a portion of the lubricating oil discharged by the hydraulic pump 81 to the right steering brake 50R. The right second oil channel 102R guides a portion of the lubricating oil discharged by the hydraulic pump 81 to the right planetary gear mechanism 30R. The third oil channel 103R guides at least a portion of the lubricating oil that has passed through the right planetary gear mechanism 30R to the right steering brake 50R. At least a portion of the planetary gear mechanism 30R is disposed further inside than the right steering brake 50R in the radial direction perpendicular to the center axis of the input shaft 26.

Therefore, because the lubricating oil can be guided from the right planetary gear mechanism 30R to the right steering brake 50R with centrifugal force via the third oil channel 103R, the lubricating oil used for lubricating the right planetary gear mechanism 30R can also be used for lubricating the right steering brake 50R. As a result, the lubricating oil supplied from the hydraulic pump 81 can be used efficiently and the capacity of the hydraulic pump 81 can be reduced. This result can be obtained in the same way for the left steering brake 50L.

The bulldozer 1 includes the right fourth oil channel 104R and the right fifth oil channel 105R. The right fourth oil channel 104R guides a portion of the lubricating oil discharged by the hydraulic pump 81 to the right steering clutch 40R. The fifth oil channel 105R guides at least a portion of the lubricating oil that has passed through the right steering clutch 40R to the right steering brake 50R. At least a portion of the right steering clutch 40R is disposed further inside than the right steering brake 50R in the radial direction.

Therefore, because the lubricating oil can be guided from the right steering clutch 40R to the right steering brake 50R by centrifugal force via the fifth oil channel 105R, the lubricating oil used for lubricating the right steering clutch 40R can also be used for lubricating the right steering brake 50R. As a result, the lubricating oil supplied from the hydraulic pump 81 can be used efficiently and the capacity of the hydraulic pump 81 can be reduced. This result can be obtained in the same way for the left steering brake 50L.

The present disclosure is not limited to the above embodiment and various changes and modifications may be made without departing from the spirit of the disclosure.

In the present embodiment, although the left and right third oil channels 103L, 103R respectively guide all of the lubricating oil that has passed through the left and right planetary gear mechanisms 30L, 30R to the left and right steering brakes 50L, 50R, the present disclosure is not limited thereto. The left and right third oil channels 103L, 103R may also respectively guide only a portion of the lubricating oil that has passed through the left and right planetary gear mechanisms 30L, 30R to the left and right steering brakes 50L, 50R. In this case, the remaining portion of the lubricating oil that has passed through the left and right planetary gear mechanisms 30L, 30R may be returned directly to the lubricating oil tank 83.

In the present embodiment, although the left and right fifth oil channels 105L, 105R respectively guide all of the lubricating oil that has passed through the left and right steering clutches 40L, 40R to the left and right steering brakes 50L, 50R, the present disclosure is not limited thereto. The left and right fifth oil channels 105L, 105R may also respectively guide only a portion of the lubricating oil that has passed through the left and right steering clutches 40L, 40R to the left and right steering brakes 50L, 50R. In this case, the remaining portion of the lubricating oil that has passed through the left and right steering clutches 40L, 40R may be returned directly to the lubricating oil tank 83.

In the present embodiment, although the left and right fifth oil channels 105L, 105R are respectively connected from the left and right steering clutches 40L, 40R to the left and right planetary gear mechanisms 30L, 30R, the present disclosure is not limited thereto. For example, the left and right fifth oil channels 105L, 105R may also be respectively connected directly from the left and right steering clutches 40L, 40R to the left and right steering brakes 50L, 50R. Alternatively, the left and right fifth oil channels 105L, 105R may also be respectively connected directly from the left and right steering clutches 40L, 40R to the lubricating oil tank 83.

What is claimed is:

1. A crawler-type work machine comprising:
   an engine;
   a transmission configured to transmit power from the engine;
   an input shaft arranged to receive power transmitted from the transmission;
   a planetary gear mechanism disposed between the input shaft and an output shaft;
   a steering clutch configured to switch between transmitting and blocking a rotational force from the input shaft to the output shaft by the planetary gear mechanism;
   a steering brake configured to brake a rotation of the output shaft;
   a hydraulic pump configured to discharge a lubricating oil;
   a first oil channel configured to guide a portion of the lubricating oil discharged by the hydraulic pump to the steering brake;
   a second oil channel configured to guide a portion of the lubricating oil discharged by the hydraulic pump to the planetary gear mechanism;
   a third oil channel configured to guide at least a portion of the lubricating oil that has passed through the planetary gear mechanism to the steering brake;
   a fourth oil channel configured to guide a portion of the lubricating oil discharged by the hydraulic pump to the steering clutch; and
   a fifth oil channel configured to guide at least a portion of the lubricating oil that has passed through the steering clutch to the steering brake,
   at least a portion of the planetary gear mechanism being disposed further inside than the steering brake in a radial direction perpendicular to a center axis of the input shaft.

2. The crawler-type work machine according to claim 1, wherein
   the planetary gear mechanism has a ring gear coupled to the input shaft, a planetary gear disposed inside the ring gear in the radial direction, a sun gear disposed inside the planetary gear in the radial direction and coupled to the steering clutch, and a carrier coupled to the planetary gear and the output shaft;
   the steering brake has a rotating member configured to rotate with the output shaft, a brake housing configured to be able to rotate relatively with respect to the rotating member, a plurality of fixing plates attached to the brake housing, and a plurality of brake disks attached to the rotating member; and
   the ring gear is disposed further inside than the plurality of brake disks in the radial direction.

3. The crawler-type work machine according to claim 1, wherein
   at least a portion of the steering clutch is disposed further inside than the steering brake in the radial direction.

4. The crawler-type work machine according to claim 2, wherein
   at least a portion of the steering clutch is disposed further inside than the steering brake in the radial direction.

* * * * *